L. STEINBERGER AND G. HILL.
INSULATED SUPPORT FOR INDUCTANCE COILS.
APPLICATION FILED AUG. 9, 1917.
1,342,303.
Patented June 1, 1920.
5 SHEETS—SHEET 1.
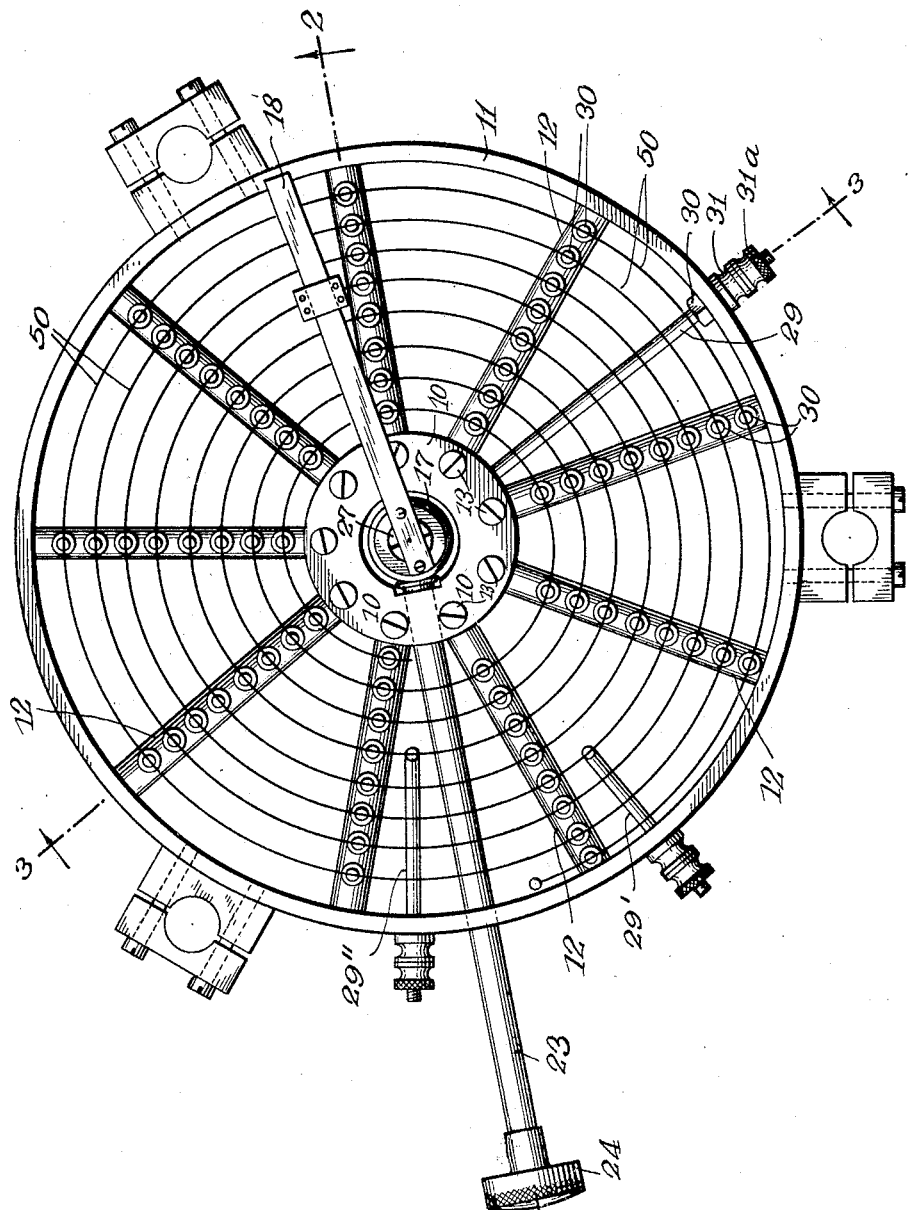

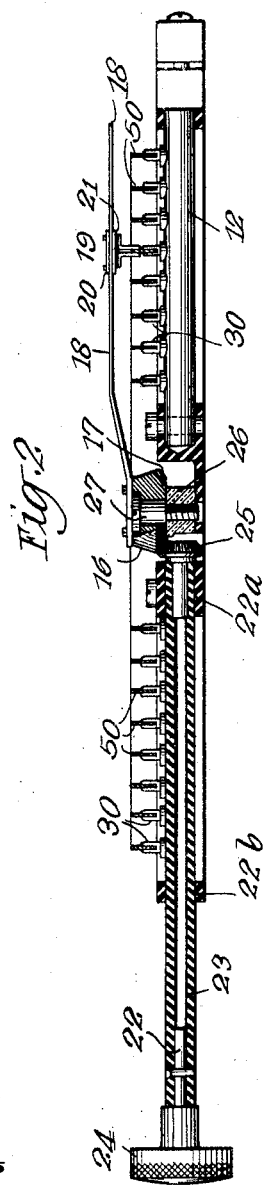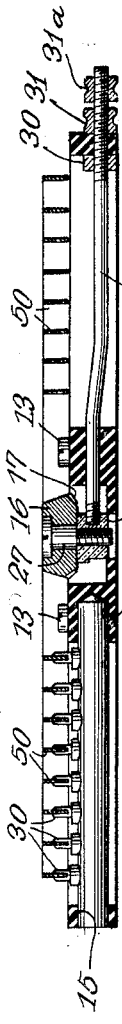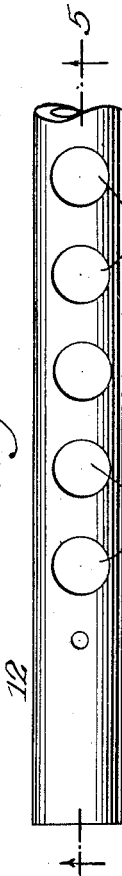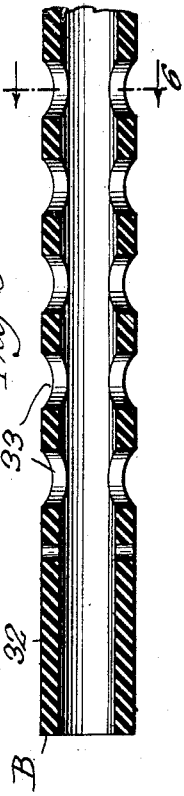

L. STEINBERGER AND G. HILL.
INSULATED SUPPORT FOR INDUCTANCE COILS.
APPLICATION FILED AUG. 9, 1917.
1,342,303.
Patented June 1, 1920.
5 SHEETS—SHEET 3.
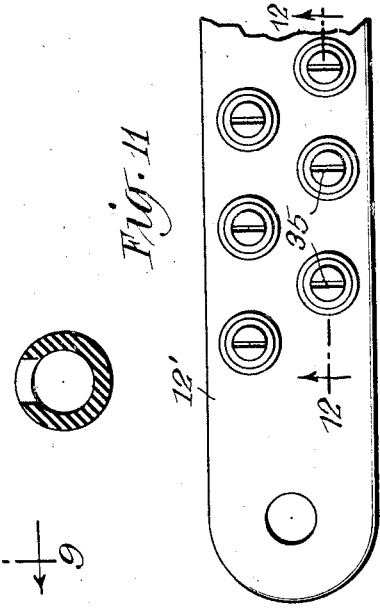
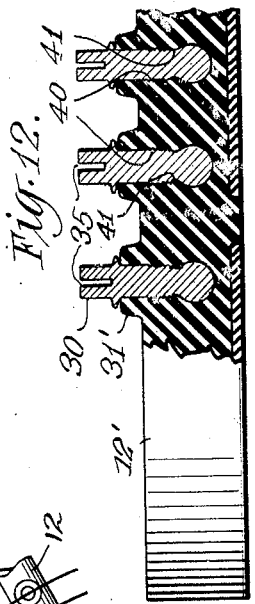
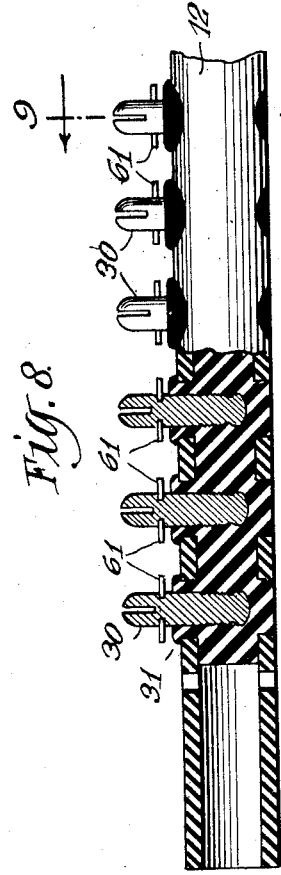
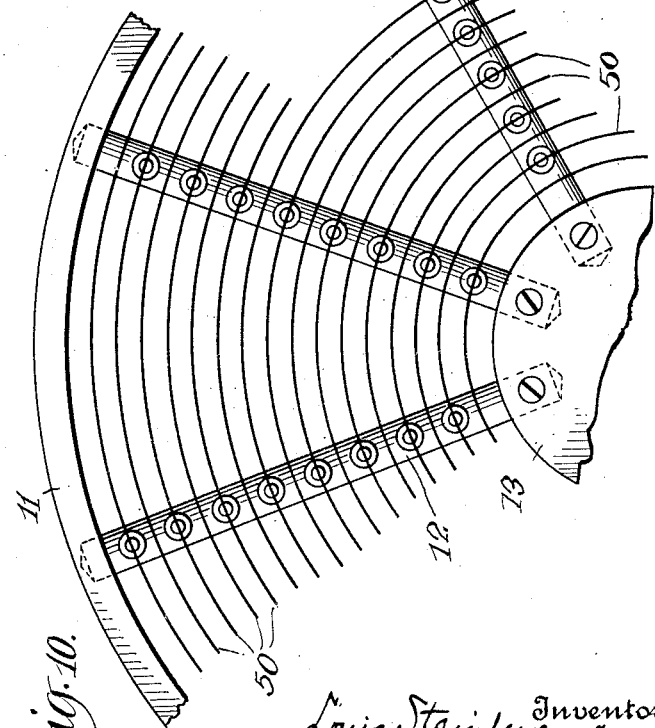
WITNESS
Inventors
Louis Steinberger
Guy Hill
By their Attorney
Cornelius C. Billings L. STEINBERGER AND G. HILL.
INSULATED SUPPORT FOR INDUCTANCE COILS.
APPLICATION FILED AUG. 9, 1917.
1,342,303.
Patented June 1, 1920.
5 SHEETS—SHEET 4.
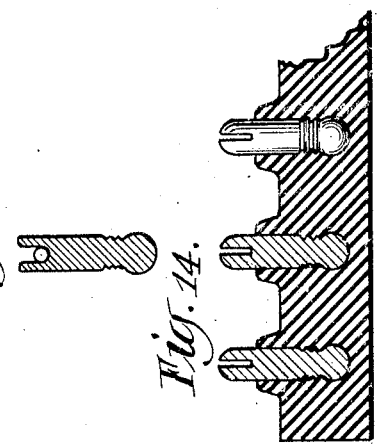
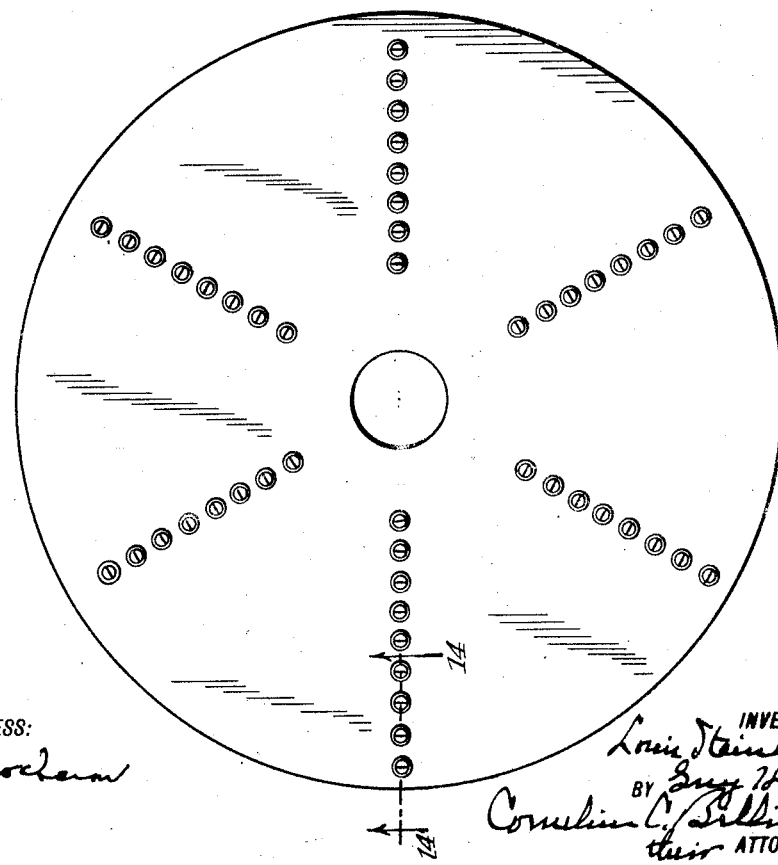

L. STEINBERGER AND G. HILL.
INSULATED SUPPORT FOR INDUCTANCE COILS.
APPLICATION FILED AUG. 9, 1917.
1,342,303.
Patented June 1, 1920.
5 SHEETS—SHEET 5.
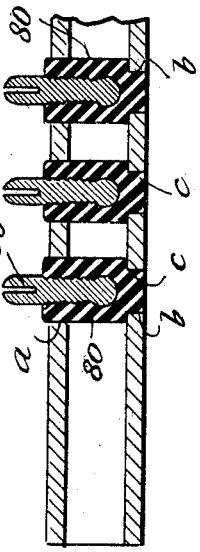
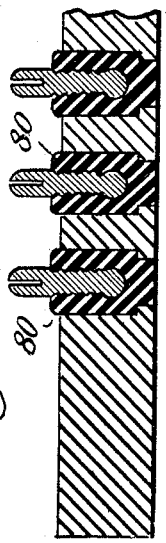
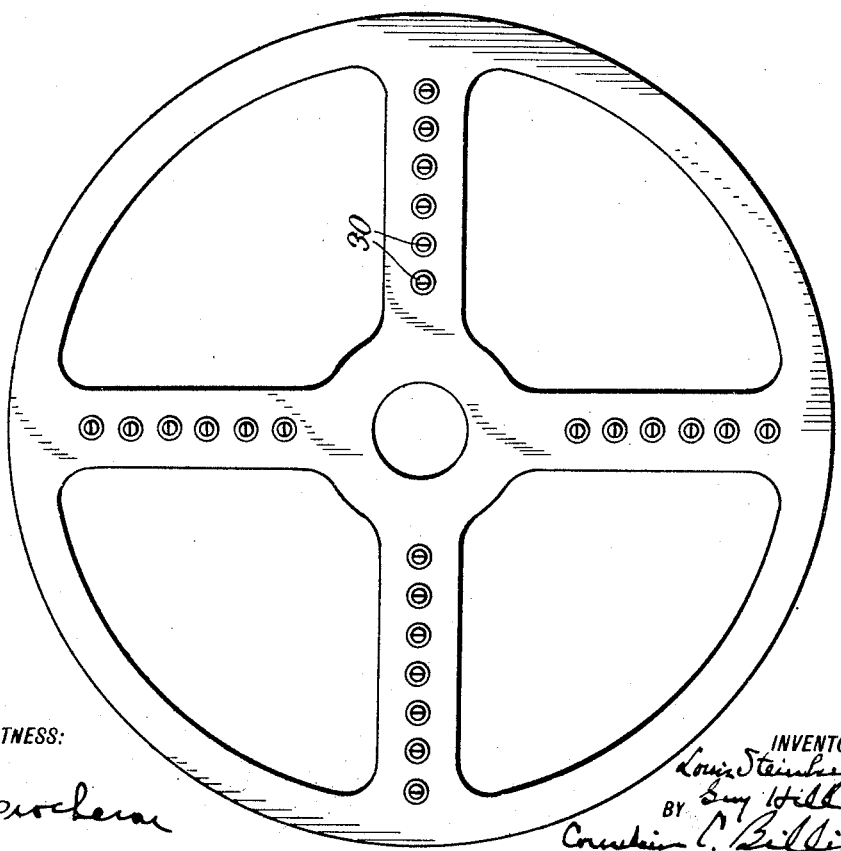

UNITED STATES PATENT OFFICE.

LOUIS STEINBERGER AND GUY HILL, OF BROOKLYN, NEW YORK.

INSULATED SUPPORT FOR INDUCTANCE-COILS.

1,342,303.          Specification of Letters Patent.      Patented June 1, 1920.

Application filed August 9, 1917. Serial No. 185,370.

*To all whom it may concern:*

Be it known that we, LOUIS STEINBERGER and GUY HILL, citizens of the United States, and residents, respectively, of the borough of Brooklyn, county of Kings, city and State of New York, have jointly invented certain new and useful Improvements in Insulated Supports for Inductance-Coils, of which the following is a specification.

Our invention relates particularly to insulated supports for mounting inductance coils in radio apparatus.

One of the objects of our invention is to so mount the conductor forming the coil that it is entirely exposed to the air except at those places where it is in metallic contact with the supporting posts or studs. Another object is to mount the conductor in such a manner as to permit it to radiate heat to a maximum degree, thereby providing for rapid self cooling of the conductor. Another object is to so mount the conductor of the inductance coil that there will be no insulating material actually between the coils by reason of the provision of insulating material only between the metal studs or posts upon which the coil is supported, and thereby reduce the distributed capacity of the coil. Another object is to so mount the coils as to produce both a maximum electrical efficiency and at the same time provide great mechanical strength. Another object is to so construct the mounting that the coil may be conveniently put in place and thereby permit of various methods of mounting. Another object is to so construct a coil and mounting therefor as to permit of a maximum ventilation and mechanical strength and also to so assemble the parts that they may be easily reached for repair and at the same time guard against the loss of electrical efficiency. Another object is to so construct a coil mounting and coil winding that the complete structure is mechanically strong and in which there are no metallic parts except those that are in electrical contact with the conductor forming the coil so that brushing to isolated metal screws and parts will be prevented. Other objects will appear from the hereinafter specification and claims.

Referring to the drawings, in which similar characters indicate the same parts in the several views:

Figure 1 is a plan of one form of a single insulated mounting for an inductance coil.

Fig. 2 is a section on line 2—2 of Fig. 1.

Fig. 3 is a section on line 3—3 of Fig. 1.

Fig. 4 is a plan of one of the insulated supports for holding additional insulating material.

Fig. 5 is a section on line 5—5 of Fig. 4.

Fig. 6 is a section on line 6—6 of Fig. 5.

Fig. 6$^a$ is a section of a support similar to that shown in Fig. 6 wherein only one wall of the support is perforated.

Fig. 7 is an elevation of one of the metal supporting studs or posts.

Fig. 8 is a vertical section partly broken away, of a tube of insulating material and the metal supporting studs embedded in an additional insulating material.

Fig. 9 is a section on line 9—9 of Fig. 8, the stud being shown in elevation.

Fig. 10 is a fragmentary view in plan of an insulated mount for another form of coil mounting.

Fig. 11 is a plan partly broken away of a modified insulated mounting for a metal stud.

Fig. 12 is a vertical section, partly broken away, on line 12—12 of Fig. 11.

Fig. 13 is a plan of another form of insulated mounting for an inductance coil, the studs being molded thereon.

Fig. 14 is an enlarged section on line 14—14 of a portion of Fig. 13, one stud shown in elevation.

Fig. 15 is a vertical section of a modified form of a pin or stud in which the exposed end is so shaped as to fit and support an inductance coil made of wire which is circular in cross section.

Fig. 16 is another form of insulated support for the plurality of rows of pins or studs properly molded into an insulating support to which the inductance coil is secured.

Fig. 17 is a sectional view of a modified form of securing the metal pins or studs to a tube of insulating material similar to those shown in Figs. 5 and 8.

Fig. 18 is a section of a sheet or rod of insulating material showing a modified manner of securing the pins or studs to the same.

Referring to Fig. 1, the insulated mounting is in general, in the form of a wheel. The central or "hub" portion 10 is secured to the outer or "felly" portion 11 by a series of radially arranged rods or "spoke" portions 12. The central or hub portion 10 and the outer ring or "felly" portion 11 are constructed of suitable insulating material which has great strength. The "spoke" portions 12 are secured to the central portion by suitable screws 13 made of fiber, the respective ends of the "spoke" portions being inserted in radially disposed holes or openings 14 and 15 made respectively in the "hub" and inner surface of the "felly." The "hub" portion has a central perforation into which fits a gear wheel 16 having beveled teeth 17 cut on its under side, and to the upper surface of which is secured an arm 18 provided with a slidable guide 19 made up of two superposed plates 20, 21, connected together by means of screws or other suitable devices, and the under plate 21 is similarly secured to adjacently arranged jaws which engage with the conductor at any desired point. Projecting through the openings 22$^a$ and 22$^b$ in the "felly" and in the "hub" respectively, is a rod or tube of insulating material, the rod having secured thereto at one end a thumb wheel 24, also preferably of insulating material, and at the other end a bevel gear 25 so arranged as to mesh with the gear 16 so the gearing may be operated to adjust the radial position of the arm 18. The central gear is secured to the block of metal 26 by a screw 27, as shown. To the metal block 26 is secured a rod 29 at one end by screw threads, the other end of said rod passing through an opening in the "felly" and provided with screw threads and adjustable lock nuts 30, 31 and 31$^a$ as shown. This rod serves to make electrical connection to the revolving arm 18 from the terminals 31 and 31$^a$.

The block 26 and the gearing may be made of insulating material in order to reduce heating set up by induced currents. In this case a metal pin 27 only is necessary to make an electrical connection between the arm 18 and rod 29, the rod 29 being of course extended to make metallic contact with the pan 27.

Rods 29' and 29" are similar but shorter than the rod 29, and these rods 29' and 29" are connected respectively to the coil 50 at different radial points so that by connecting rod 29 with 29' or with 29" different amounts of inductance can be chosen.

Each radial portion of the insulating material 12' constituting a "spoke" may be rectangular in shape, as shown in Figs. 11 and 12, and preferably made of the insulating material known in the art as "electrose." In this form the posts or studs 30 are embedded in the insulating material and secured thereto by means of serrations 40, and a groove 41 near the end thereof, the upper end having kerfs or slots 35 into which fits the edge of the continuous metallic body forming the conducting coil 50. The molding is so shaped that there is a stud or collar 31' of "electrose" formed around each stud or post as it projects out of the bar or spoke of insulating material.

The preferred form of spoke is constructed from a skeleton tube 32 made of suitable insulating material B, which is mechanically strong. Radial holes 33 are bored through the tube at equidistant points as shown in Figs. 4 to 6 or only through one side wall as shown in Fig. 6$^a$. The posts or studs 30 are inserted in each hole so that one end of the stud is in approximate alinement with the axis of the tube, the projecting or slotted end of the stud extending out from the tube. The tube is then filled with insulating material E known as "electrose" so that the studs are molded into the "electrose" and secured to the tube by the "electrose." The plastic insulating material is caused to project out through the holes in one side of the tube so as to form a collar 31 of insulating material around the projecting stud at the upper surface of the tube. The metal studs may be provided with an annular collar 60 as shown in Fig. 7 or with projecting studs 61 of metal which may be either integrally formed with the metal of the stud, as shown at 61$^a$ in Fig. 9, or may consist of separate pins 61, as shown in Fig. 8. The conductor coil 50 may be of copper wire or preferably metallic tape and it is wound around in a spiral form, the lower edge of the tape resting in the slots of the posts or studs projecting from the "spoke" portions of the insulator frame, where it may be secured thereto by any well known means as by brazing or soldering.

In the construction shown in Fig. 10, the spokes 12 are so arranged in position that the metallic ribbon 50 constituting the coil is connected by means of a metallic post or stud to every other "spoke" thus forming a winding as shown in said figure having twice as many turns as that shown in Fig. 1, in which latter figure the coil is connected to each "spoke" in succession, so that more inductance can be obtained with the winding of Fig. 10 than with the winding of Fig. 1, notwithstanding the fact that in each case the posts and studs of each is equal. In order to obtain the increased inductance due to the winding of Fig. 10, the spokes 12 are inserted in the hub 10 in a slightly different arrangement than that shown in Fig. 1, which different arrangement is clearly indicated in Fig. 10.

By properly spacing the posts or studs the coil 50 may be wound partly in the manner illustrated in Fig. 1 and partly in the manner illustrated in Fig. 10. When these two methods of winding are used, i. e., when a structure is made up of turns wound partly as in Fig. 1 and partly as in Fig. 10, the inner turns are preferably wound as illustrated in Fig. 1 and the outer turns are wound as illustrated in Fig. 10. The inner turns are thus wound in order to reduce the heating thereof and also to reduce the metallic parts at the center of the coil. The studs may be made of brass and are preferably tinned after slotting, and the conductor is preferably of copper. The insulating material of the spokes may be of any suitable plastic material, but it is preferably made, as above stated, of the material known as "electrose." The preferable form of spoke portions is, however, a tube of insulating material of substantial mechanical strength, each tube being filled with "electrose."

From the construction described it is clearly seen that the conducting strip forming the coil 50 is substantially entirely exposed to the air except where it rests in metallic contact with the posts or studs. This construction results in a coil which is enabled to radiate heat for all practical purposes as well as if the coil were substantially freely supported in the air, inasmuch as no portion of the coil is inclosed in the insulating material. In fact, the construction is such that because of the contact of the coil conductor with the metal posts or studs, the heat radiating ability of the conductor, that is, its ability for rapid self cooling, is greater than that which would be caused from a self contained coil.

By means of the above described construction, the distributed capacity due to the insulating supports is at a minimum, as there is no insulating material actually between the material of the coils, the only insulating material being between the metal studs on which the coil is supported.

Should there be an excess of voltage applied to the coil or any portion thereof, the spark will pass between the studs and thus no damage to the insulating material will take place. This effect can be made more positive by the use of small annular integral collars or projections, or separate pins, secured to the studs, as hereinabove described. These collars and pins when added will thus serve to form protective spark gaps across which any excessive potential may discharge.

In our construction by the winding of the coil conductor in the manner described, and permitting it to rest in the metal supports which are molded to a suitable insulating material, the possibility of "brushing" is reduced to a minimum, because the metal studs or pegs are in such close contact with insulating material that there is no air space between the metal and the insulating material, and there is practically no chance for "brushing" to take place, the effect obtained being the same as though the studs were immersed in oil. The embedded portions of the studs are usually rounded in form also to prevent a tendency to "brushing" or electrical break down in the insulating material.

The use of our invention results in a coil having great electrical efficiency and mechanical strength and which can also be readily and conveniently mounted; also the construction is such that it is possible to obtain a maximum of ventilation without loss of mechanical strength and electrical efficiency; also the construction permits a sliding contact to move over the coil so that the desired proportion of the inductance in the coil can be put in circuit. Moreover, the parts are easily reached for the purpose of repair.

Each coil is provided with an adjusting arm so that it may be made up of a self contained unit, and any desired inductance can be obtained by combining and mounting together the desired number of units or coils.

The preferred form of our invention as hereinabove referred to consists of a skeleton frame of insulating material in which the metal studs 30 are secured as heretofore described, and therefore this construction is the one which we use for most purposes.

There are cases, however, where it is of advantage to mount coils (usually of small diameter) on metal studs that are secured into sheets or slabs of insulating material as shown in Figs. 13, 14, 16, and 18. These slabs can be made solid as shown in Fig. 13, or with sections cut out, as shown in Fig. 16, so as to provide ventilation and more readily attach clips to or otherwise make electrical connection to the coil.

As illustrated in several figures of the drawing, the metal pins or studs 30 are so formed with ridges and corrugations that they are secured to the insulating material during the process of molding and are thereby held to the supporting plate or slab.

In Fig. 16 the metal pins or studs are set into an insulating form similar to the construction and arrangement of mounting shown in Fig. 1, except that the "hub," "spokes" and "rim" are all made integral with each other and preferably molded together during the process of manufacture.

Referring to Figs. 17 and 18, we have shown a means of securing the metal pins or studs so that these means can be used in any of the contructions herein referred to. By means of this construction each metal pin or stud is molded into a separate piece of insulating material 80, and then these insulators 80 each contain one stud fitted into oppositely disposed holes $a$ and $b$ which are so arranged that the tenon $c$ of the insulating block 80 fits in the smaller hole $b$ and the entire structure is thus permanently built up. A similar arrangement is shown in Fig. 18, where plugs of insulating material are fitted in openings in the main plate or slab as shown.

It is obvious that the insulators referred to can be secured in place by a screw thread or by a close sliding fit which is more particularly shown.

As changes of construction could be made within the scope of our invention, it is intended that all matter contained in the above description or shown in the accompanying drawings shall be interpreted as illustrative and not in a limiting sense.

Having now described our invention, what we claim as new and desire to secure by Letters Patent is:

1. In a device of the kind described, a central portion of insulating material, a series of arms of insulating material radially projecting therefrom, a series of metal posts or studs partially embedded in each arm, a conducting coil mounted in the exposed ends of said posts or studs and a strip of insulating material connecting the free ends of the said projecting arms of insulating material.

2. In a device of the kind described, a skeleton frame of insulating material consisting of a central portion, a concentric rim portion, a series of rods secured thereto and extending radially from the center, and a series of metallic studs embedded in each radially extending rod, the radial distances of the studs in one rod alternating with the radial distances of the studs on an adjacent rod.

3. In a device of the kind described, a skeleton frame of insulating material consisting of a central portion, a concentric rim portion, a series of rods secured thereto and extending radially from the center, a series of metallic studs embedded in each radially extending rod, the radial distances of the studs in one rod alternating with the radial distances of the studs on an adjacent arm, and a conductor secured to the metallic studs.

4. In a device of the kind described, a support of insulating material, a plurality of metallic studs one end of each of which is embedded in and permanently secured to the said support, the exposed end of said studs having vertical slots therein and projections on their sides below the bottoms of said slots extending toward each other.

5. In a device of the kind described, a support of insulating material, a plurality of metallic studs one end of each of which is embedded in and permanently secured to the said support, the exposed ends of each stud being provided with annular projections opposite to each other.

6. In a device of the kind described, a support of insulating material, a plurality of metallic studs one end of each of which is embedded in and permanently secured to the said support, the exposed ends of each stud having projections extending therefrom to form protective spark gaps therebetween.

7. In a device of the kind described, a support of insulating material, metallic studs partially embedded in and permanently secured to said support, each of said studs being surrounded at their point of projection with a collar of insulating material integral with the insulating support.

8. In a device of the kind described, a support of insulating material, a plurality of metallic studs, one end of each of which is embedded in and permanently secured to said support, the exposed end of said studs having vertical slots therein, and projections on their sides below the bottoms of said slots, said projections extending toward each other.

9. In a device of the kind described, a support of insulating material, a plurality of metallic studs, one end of each of which is embedded in and permanently secured to said support, the exposed ends of each stud being provided with annular projections opposite each other, and an inductance coil secured to the ends of said stud.

10. In a device of the kind described, a support of insulating material, a plurality of metallic studs secured to the said support, the exposed ends of each stud having projections extending therefrom opposite each other, and an inductance coil secured to the free ends of said stud.

11. In a device of the class described, a stud support of insulating material, tubular in form, a core of insulating material within said stud support, metallic studs partially embedded within said insulating material.

12. In a device of the class described, a pin support of insulating material, coil supporting pins carried thereby, a coil supported upon said parts, and means for detachably securing said pins and coil to the pin support.

13. A pin supporting bar, insulating plugs carried by said bar, and coil supporting pins carried by said insulating plugs.

14. A pin supporting structure of insulating material, coil carrying pins detachably secured to said supporting structure, and an inductance coil carried by said pins the pins and coil being bodily detachable from the support.

15. A pin supporting structure of insulating material, coil carrying pins, means for detachably securing said pins to said supporting structure, and an inductance coil carried by said pins, the pins and coil being detachable as an entirety from the support.

16. A support for an inductance coil consisting of an insulating frame work having holes suitably located therein and metal studs each molded into a separate insulating container, the said container fitting said holes and thereby secured to said support, and a coil of desired dimensions mounted on said studs.

17. In a device of the class described, a stud support of insulating material, tubular in form, having holes at right angles to the axis of tube, the tube being filled with insulating material which projects through said holes, the insulating material forming a solid mass without air spaces, and metal studs partially embedded in the insulating material and projecting through said holes.

18. In a device of the kind described, a self-contained unitary structure comprising a central portion of insulating material, a series of arms of insulating material radially projecting therefrom, a ring of insulating material secured to the free ends of said arms, and a series of metal posts or studs partially embedded in said radial arms.

19. In a device of the kind described, a self-contained unitary structure comprising a skeleton frame of insulating material consisting of a central portion, a series of radial arms secured thereto, a ring of insulating material secured to the free ends of said arms, and a series of metal posts or studs insulated from each other and embedded in the said arms, said studs being arranged in rows radially extending from a common center.

20. A skeleton frame consisting of a block of insulating material, a strip of insulating material encircling said block, rods of insulating material connecting the block to the strip, and an inductance coil secured to said rods the insulating material between the turns of the conducting coil being suitable for withstanding high frequency and high tension voltages.

In witness whereof we have hereunto set our hands at borough of Manhattan, city and State of New York, this fourth day of August, 1917.

LOUIS STEINBERGER.
GUY HILL.

In presence of—
ISABEL R. RICHARDS,
C. C. BILLINGS.